(12) United States Patent
Henry et al.

(10) Patent No.: US 11,413,789 B2
(45) Date of Patent: Aug. 16, 2022

(54) ASSEMBLY TO MANUFACTURE A ROLL OF PREPREG MATERIAL

(71) Applicant: The Boeing Company, Chicago, IL (US)

(72) Inventors: Jack William Henry, Saint Charles, MO (US); Daniel Austin Charles, Chicago, IL (US); Aaron Ross Cowin, Dardenne Prairie, MO (US)

(73) Assignee: THE BOEING COMPANY, Chicago, IL (US)

( * ) Notice: Subject to any disclaimer, the term of this patent is extended or adjusted under 35 U.S.C. 154(b) by 395 days.

(21) Appl. No.: 16/594,455

(22) Filed: Oct. 7, 2019

(65) Prior Publication Data

US 2021/0101314 A1 Apr. 8, 2021

(51) Int. Cl.
*B65H 39/14* (2006.01)
*B29B 11/16* (2006.01)
*B65H 37/04* (2006.01)

(52) U.S. Cl.
CPC .............. *B29B 11/16* (2013.01); *B65H 37/04* (2013.01); *B65H 39/14* (2013.01)

(58) Field of Classification Search
None
See application file for complete search history.

(56) References Cited

U.S. PATENT DOCUMENTS

| 10,076,883 | B2 | 9/2018 | Prebil et al. | |
| 2013/0217558 | A1* | 8/2013 | Glockner | B29C 70/20 493/393 |
| 2016/0325509 | A1* | 11/2016 | Prebil | B29C 66/72141 |

FOREIGN PATENT DOCUMENTS

| EP | 1431023 A3 * | 7/2005 |
| JP | 2009-226817 A1 * | 10/2009 |

* cited by examiner

*Primary Examiner* — Jeffry H Aftergut
(74) *Attorney, Agent, or Firm* — Coats & Bennett, PLLC

(57) ABSTRACT

An assembly to manufacture a roll of prepreg material. The assembly includes a moving system for picking a sheet of prepreg material from a stack of sheets and moving the sheet along a feed path. An alignment system aligns a leading edge of the sheets with a trailing edge of a roll of the prepreg material. A welding system connects the sheet to the roll.

20 Claims, 9 Drawing Sheets

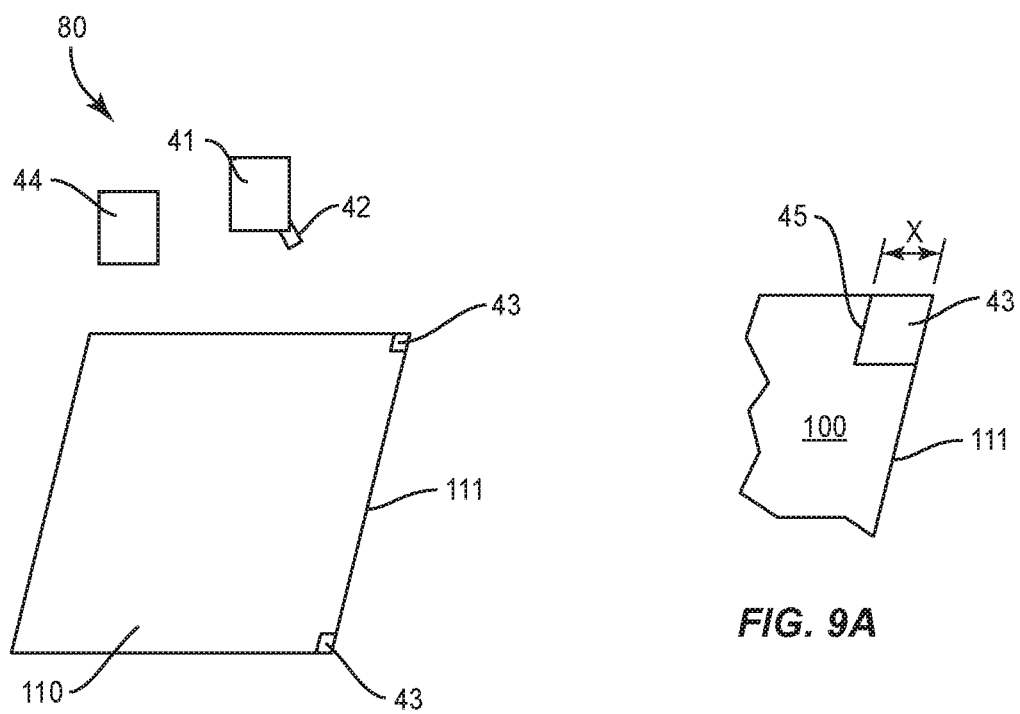
FIG. 9
FIG. 9A
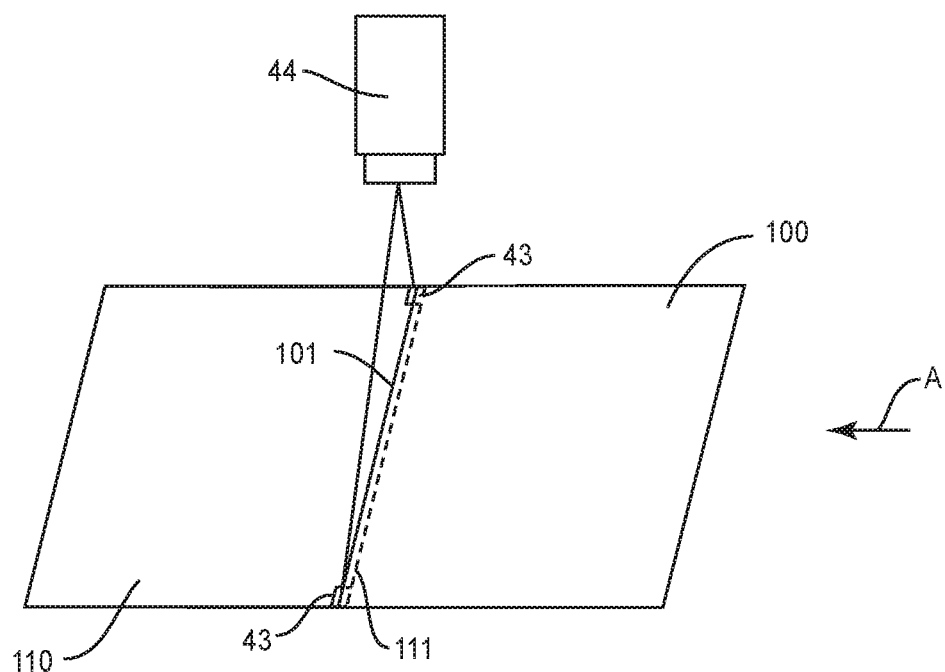
FIG. 10

ASSEMBLY TO MANUFACTURE A ROLL OF PREPREG MATERIAL

TECHNOLOGICAL FIELD

The present disclosure relates generally to the field of prepreg material and, more specifically, to the field of manufacturing rolls of prepreg material.

BACKGROUND

Prepreg materials are composite materials in which a high-strength reinforcement fiber is pre-impregnated with a thermoset or a thermoplastic resin. Prepreg material can be used to manufacture a wide variety of goods within a wide variety of contexts. Examples include but are not limited to manufacturing aircraft bodies within the aviation industry and automobile bodies within the automotive industry.

Prepreg material may be manufactured in rolls having various widths and lengths. The rolls include different sections in which the fibers are oriented in a particular orientation. The fiber orientation can provide for the needed strength and stiffness properties. Examples include a 0° orientation in which a majority of the fibers are oriented parallel to the lengthwise direction of the roll. Other examples include a 45° orientation with the majority of the fibers being aligned at a 45° angle relative to the length of the roll, and a 90° orientation with the fibers oriented perpendicular to the length of the roll.

The different sections can be formed by individual sheets that are attached together in an end-to-end configuration. The manufacturing process provides for moving the individual sheets along a path and connecting the individual sheets to the end of an existing roll. There is a need for a manufacturing assembly and process that is able to handle individual sheets of prepreg material to form the rolls.

SUMMARY

One aspect is directed to an assembly to manufacture a roll of prepreg material. The assembly comprises a tray and a feed path that extends from the tray. At least one pick roller is positioned at the feed path and is configured to rotate to pick a sheet of the prepreg material from the tray and to move the sheet along the feed path. A positioning bar extends across the feed path downstream from the at least one pick roller and that comprises an edge configured to contact against a leading edge of the sheet. At least one welding shoe locally heats the roll and the sheet and forms a weld seam that joins the sheet in an overlapping arrangement with the roll.

In another aspect, at least one alignment roller is positioned along the feed path downstream from the at least one pick roller and upstream from the positioning bar with the at least one alignment roller contacts against the sheet and to rotate to move the sheet into contact with the positioning bar.

In another aspect, the feed path further comprises a support positioned along the feed path between the at least one pick roller and the bar with the support comprising a top surface that supports the sheet and an edge that extends along a lateral edge of the support to laterally position the sheet while the sheet moves along the feed path.

In another aspect, a separation pad is positioned along the feed path between the tray and the support and positioned on an opposing side of the feed path from the at least one pick roller with the separation pad comprising a support surface to contact the sheet and maintain the sheet in contact with the at least one pick roller as the sheet moves from the tray.

In another aspect, a marking and optical system comprises at least one marker to form one or more marks on the roll in proximity to a trailing edge of the roll, and at least one image capture device to capture at least one image of the trailing edge of the roll and the leading edge of the sheet.

In another aspect, the at least one marker comprises a nozzle to emit ink onto the roll and form the one or more marks.

In another aspect, the positioning bar extends laterally across the feed path and is positioned downstream from the at least one marker and the at least one welding shoe.

In another aspect, a controller determines an amount of overlap between the trailing edge of the roll and the leading edge of the sheet based on the images captured by the at least one image capture device.

In another aspect, the positioning bar is vertically adjustable relative to the feed path between a first position that is in proximity to the feed path for the leading edge of the sheet to contact against the positioning bar and a second position that is positioned away from the feed path for the sheet to pass along the feed path underneath the positioning bar.

One aspect is directed to an assembly to manufacture a roll of prepreg material. The assembly comprises a controller with a control circuit and is configured to: rotate at least one pick roller and move a sheet of the prepreg material from a tray and along a feed path; position a positioning bar across the feed path to contact a leading edge of the sheet when the leading edge is overlapping with a trailing edge of the roll; determine an amount of overlap between the leading edge of the sheet and the trailing edge of the roll; and connect together the sheet and the roll with the leading edge of the sheet overlapping with the trailing edge of the roll.

In another aspect, the controller is further configured to form at least one mark on the trailing edge of the roll and capture at least one image of the trailing edge of the roll after the leading edge of the sheet overlaps with the roll.

One aspect is directed to a method of manufacturing a roll of prepreg material. The method comprises: rotating at least one pick roller that is in contact with a sheet and moving the sheet along a feed path; contacting a leading edge of the sheet against a positioning bar that extends across the feed path and stopping the sheet with the leading edge overlapping with a trailing edge of the roll; identifying that the leading edge of the sheet and the trailing edge of the roll are in an overlapping arrangement; and connecting together the sheet to the trailing edge of the roll with the leading edge of the sheet overlapping with the trailing edge of the roll.

In another aspect, the method comprises marking the trailing edge of the roll with at least one mark prior to overlapping the leading edge of the sheet with the trailing edge of the roll.

In another aspect, the method comprises determining an amount of the at least one mark that is visible beyond the sheet and determining the overlap between the leading edge of the sheet and the trailing edge of the roll.

In another aspect, the method comprises preventing an underneath sheet from being picked with the sheet by moving the sheet between the at least one pick roller and a separation pad.

In another aspect, the method comprises maintaining an orientation of the sheet while moving the sheet along the feed path.

In another aspect, the method comprises moving the positioning bar away from the feed path after the leading edge of the sheet contacts against the positioning bar and prior to connecting together the sheet and the roll.

In another aspect, the method comprises positioning the trailing edge of the roll on an upstream side of the positioning bar and overlapping the leading edge of the sheet on the upstream side of the positioning bar.

In another aspect, the method comprises: rotating at least one alignment roller concurrently with the at least one pick roller and moving the leading edge into contact with the positioning bar with the at least one alignment roller being positioned along the feed path downstream from the at least one pick roller; and stopping the rotation of the at least one alignment roller after the leading edge contacts against the bar.

In another aspect, the method comprises concurrently contacting the sheet with the at least one alignment roller and the at least one pick roller.

The features, functions and advantages that have been discussed can be achieved independently in various aspects or may be combined in yet other aspects, further details of which can be seen with reference to the following description and the drawings.

BRIEF DESCRIPTION OF THE DRAWINGS

FIG. 9 is a schematic view of a marking and optical system.

FIG. 9A is an enlarged portion of FIG. 9 illustrating a mark on a trailing edge of a roll of material.

FIG. 10 is a schematic view of an imaging device that captures of an image of a sheet overlapping a roll.

DETAILED DESCRIPTION

Figure 1:
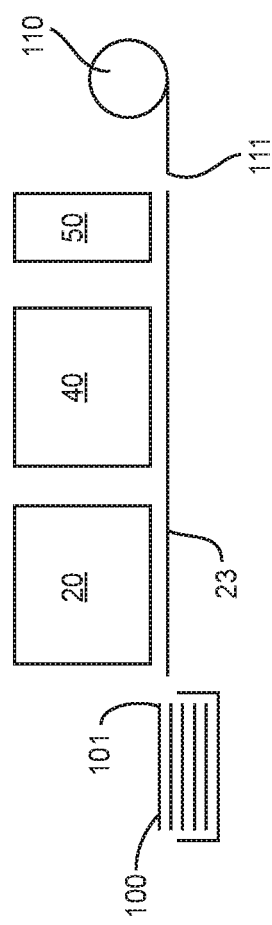
FIG. 1 is schematic diagram of an assembly to manufacture a roll of prepreg material.

FIG. 1 illustrates a block diagram of an assembly 10 for manufacturing a roll of prepreg material. The assembly 10 includes a moving system 20 for picking a sheet 100 of prepreg material from a stack of sheets 100 and moving the sheet 100 along a feed path 23. An alignment system 40 aligns a leading edge 101 of the sheets 100 with a trailing edge 111 of a roll 110 of the prepreg material. A welding system 50 connects the sheet 100 to the roll 110.

The roll 110 is formed by multiple sheets 100 that are connected together in an end-to-end configuration. Initially, the roll 110 consists of a single sheet 100. Additionally sheets 100 are connected to the trailing edge 111 of the roll 110 to increase the length. The roll 110 can include various lengths and be formed from various numbers of sheets 100 that are connected together. The roll 110 can be formed around a core that supports the sheets 100. The core can further be contacted by a roll device 90 to rotate and wind additional sheets onto the roll 110.

Figure 2:
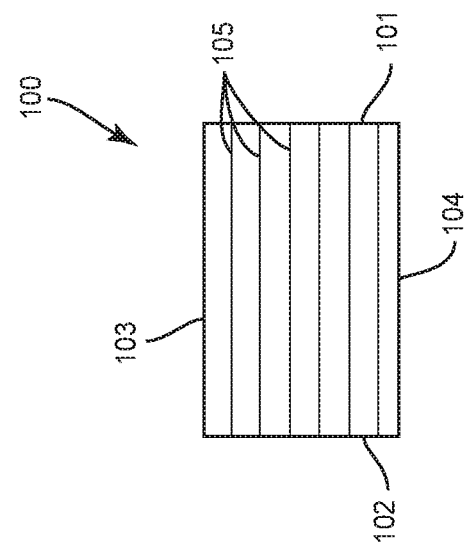
FIG. 2 is a schematic plan view of a sheet of prepreg material.

FIG. 2 illustrates a sheet 100 of prepreg material. The sheet 100 includes a leading edge 101, trailing edge 102, and lateral edges 103, 104. The sheet 100 can include a variety of different shapes and sizes, including a substantially rectangular shape as illustrated in FIG. 2. The sheet 100 includes one or more layers of unidirectional fibers 105 that are pre-impregnated with a thermoset or thermoplastic matrix resin (e.g., prepreg). In the example of FIG. 2, a majority of the fibers 105 are oriented parallel to the lengthwise direction measured between the leading and trailing edges 101, 102 (i.e., a 0° sheet). The fibers 105 can be aligned at different orientations within the sheet. Another example includes a 90° sheet with the fibers 105 being substantially perpendicular to the lengthwise direction. In sheets 100 with multiple layers of fibers 105, the fibers 105 of each layer can be aligned in the same or different orientations. The sheet 100 can include a variety of thicknesses. Examples include but are not limited to thicknesses of between about 0.0025-0.0175 inches.

The fibers 105 can be formed from a variety of materials, including but not limited to aramids, polyolefins, metal, glass, carbon, boron, ceramic, mineral, and combinations. The thermoplastic matrix resin can be formed from a variety of substances, including but not limited to acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions.

Figure 3:
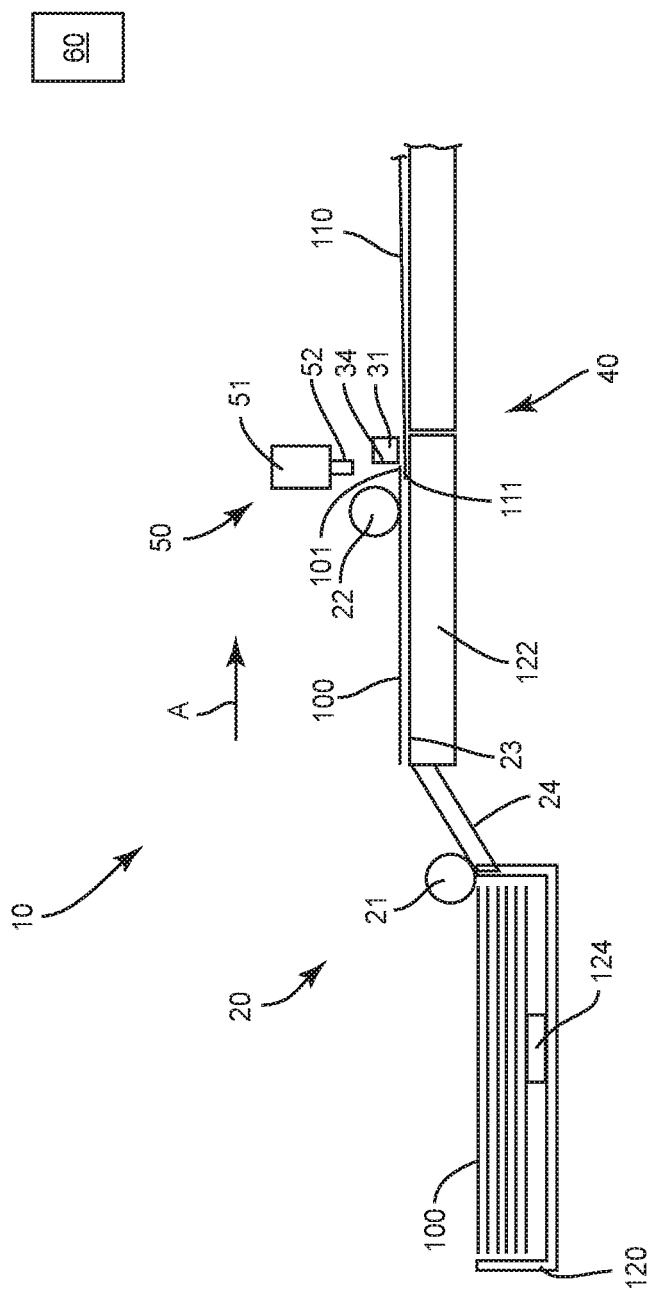
FIG. 3 schematic side view of an assembly to manufacture a roll of prepreg material.

FIG. 3 illustrates an assembly 10 to manufacture a roll 110 of prepreg material. The assembly 10 includes a moving system 20 for picking and moving sheets 100 from a tray 120 and along a feed path 23. An alignment system 40 positions the sheets 100 with a leading edge overlapping with a trailing edge of the roll 110. A welding system 50 provides for connecting the sheet 100 to the roll 110.

The sheets 100 can be initially positioned in a tray 120 that is positioned in proximity to the feed path 23. The tray 120 is sized to support and position the sheets 100 for engagement with the moving system 20. As illustrated in FIG. 3, the tray 120 is sized to contain a stack of the sheets 100 with the top-most sheet 100 positioned for contact with the moving system 20. The tray 120 can be configured to maintain the top-most sheet 100 at a predetermined position. In one example, this includes the tray 120 being vertically movable to position the top-most sheet 100. In another example, a biasing member 124 biases the stack to maintain the top-most sheet 100 positioned against the moving system 20.

The feed path 23 is positioned to support the sheets 100 after being picked from the tray 120. The feed path 23 includes one or more supports 122 with a surface that contacts against and supports the sheets 100. The feed path 23 also includes a separation pad 24 that is positioned at the tray 120 to support the sheets 100 prior to being moved to the one or more supports 122. In one example, the separation pad 24 is angled upward to support the sheets 100 as they move from the tray 120 which is vertically below the one or more supports 122.

The moving system 20 comprises rollers 21, 22 that contact against and rotate to move the sheets 100 along the feed path 23 in the direction indicated by arrow A. The rollers 21, 22 can be rotated at various speeds to control the movement of the sheet 100 while moving along the feed path 23. In one example, the rollers 21, 22 include a circular sectional shape to facilitate the contact with the sheets 100 during rotation and maintain contact at the various rotational positions. In other examples, the rollers 21, 22 non-circular sectional shapes. The rollers 21, 22 positioned along the feed path 23 can include the same or different shapes and/or sizes. The rollers 21, 22 can be constructed from a variety of different materials. The different rollers 21, 22 can be constructed from the same or different materials.

FIG. 3 illustrates rollers 21, 22 positioned along the feed path 23 to move and align the sheets 100. Additional rollers can be positioned at various locations along the feed path 23 to further move and align the sheets. In one example, rollers are positioned along the feed path 23 between rollers 21, 22. Each location can include a single roller, or two or more rollers that are located at different spacings across the length of the feed path 23.

Figure 4:
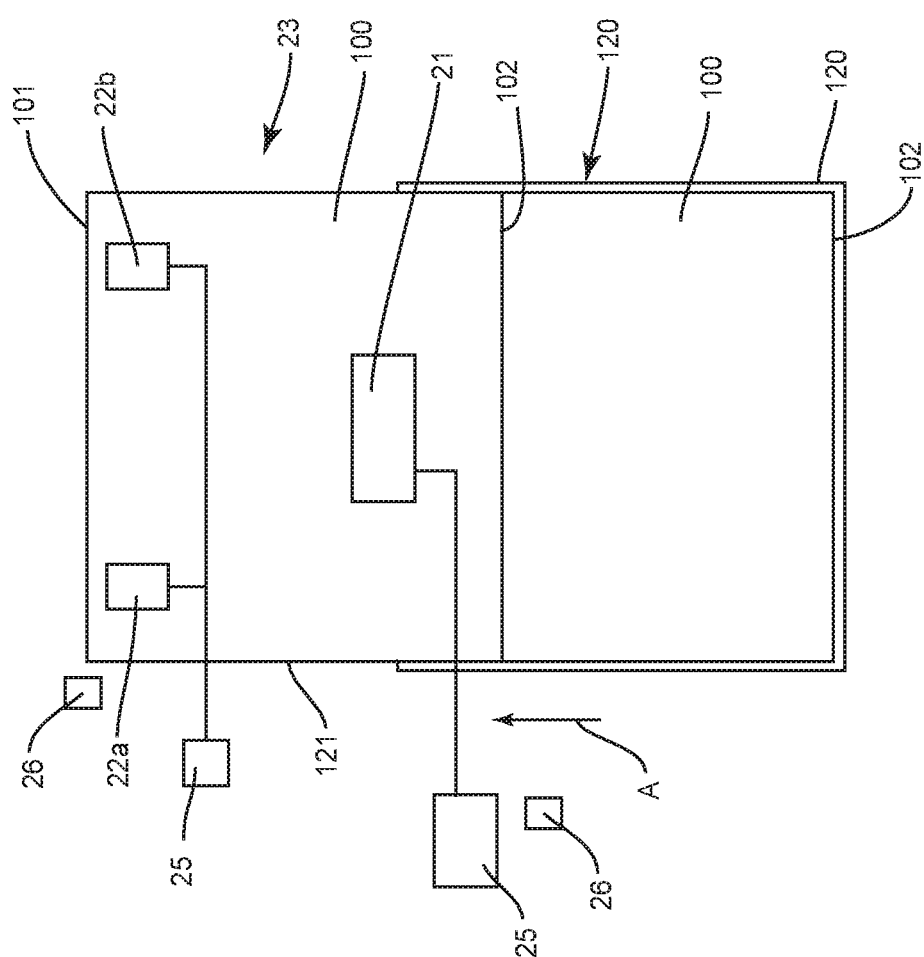
FIG. 4 is a schematic top view of a section of a feed path for moving sheets of material.

One or more rollers 21 are positioned to pick the sheets 100 from the tray 120. As illustrated in FIG. 4, a single roller 21 is positioned to pick the sheets 100 from the tray 120. Other examples include two or more rollers 21. The roller 21 is positioned to contact against the top-most sheet 100 and rotate to pick the sheet 100 from the tray 120.

The roller 21 is also positioned opposite from the separation pad 24. The rollers 21 can be in contact with the separation pad 24 or in close proximity to form a constriction to prevent more than one sheet 100 from being picked at a time from the tray 120. In the event that more than one sheet 100 is picked from the tray 120, the rollers 21 maintain contact with the top sheet 100 and rotate to drive the sheet 100 through the constriction with the separation pad 24. The one or more lower sheets 100 are not in contact with the rollers 21 and are not driven through the constriction and thus are prevented from moving along the feed path 23.

Rollers 22 are positioned along the feed path 23 downstream from the rollers 21. In one example as illustrated in FIG. 4, a pair of rollers 22a, 22b are spaced apart across the width of the feed path 23. Other examples include a single roller 22 or three or more rollers 22 positioned across the feed path 23. The rollers 22 are positioned a distance along the feed path 23 that is less than a length of the sheet 100. Thus, the rollers 22 receive the sheet 100 while the sheet 100 is being driven by the rollers 21. The rollers 22 can be driven at various speeds to move the sheets 100 along the feed path 23. In examples with two or more rollers 22 (e.g., rollers 22a, 22b), the different rollers 22 can be rotated at different speeds to control the alignment of the leading edge 101 of the sheets 100. Different rotational speeds between the rollers 22a, 22b causes lateral shifting of the sheets 100 as they move along the feed path 23. This shifting can provide for aligning the leading edge 101 with the trailing edge 111 of the roll 110.

One or more guide edges 121 extend along one or more lateral sides of the feed path 23. The guide edges 121 include flat surfaces that provide a contact surface against which the sheets 100 contact and slide along during movement along the feed path 23. The guide edges 121 prevent the sheets 100 from moving off the feed path 23 and can also align the sheets 100. In one example, the guide edges 121 include a smooth edge that provides for one or more of the lateral edges 103 and leading edge 101 to contact and slide against while the sheet 100 is being driven by one or more of the rollers 21, 22. The guide edges 121 are positioned downstream from the tray 120

One or more motors 25 provide for rotation of the rollers 21, 22. The motors 25 can be unidirectional to drive the rollers 21, 22 in a single direction, or can be multidirectional to drive the rollers 21, 22 in both forward and rearward directions. In one example, the motors 25 drive the rollers 21, 22 backwards to form a buckle in the sheets 100 to remove skew. In one example, the motors 25 are directly connected to the rollers 21, 22. In another example, the motors 25 are connected to the rollers 21, 22 through one or more shafts.

One or more sensors 26 measure the position of the sheets 100 along the feed path 23. The sensors 26 can detect the position in various manners. In one example, the sensors 26 are optical sensors positioned along the feed path 23 to detect the leading edge 101 and/or trailing edge 102 of the sheets 100 when passing the sensor location. In another example, the sensors 26 are optical encoders that sense the amount of rotation of the drive motors 25. Signals from the sensors 26 are received by a controller 60 to calculate the position of the sheets 100 along the feed path 23. Sensors 26 can also include one or more laser micrometers or optical sensors configured for measuring the gap or distance between the trailing and leading edges of adjacent sheets 100. Other sensors 26 include but are not limited to still cameras and/or video cameras, and fiber optic sensors.

Figure 5:
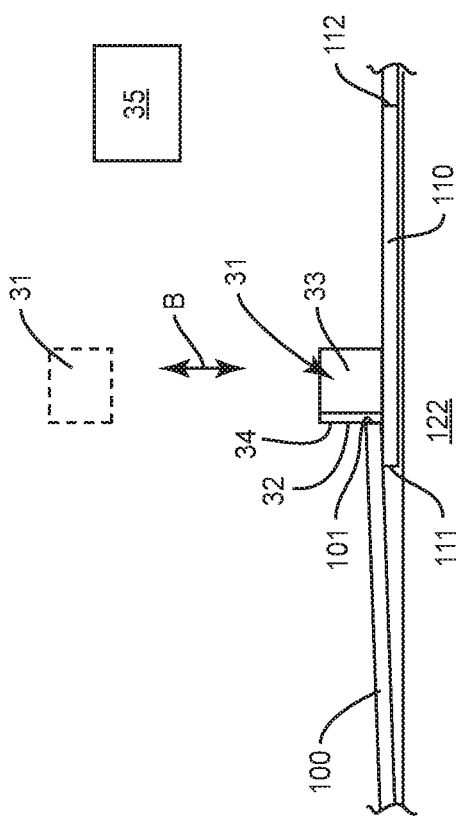
FIG. 5 is a schematic side view of a positioning bar located to position a sheet relative to a roll.

The moving system 20 moves a sheet 100 along the feed path 23 and into an overlapping arrangement with the roll 110. As illustrated in FIG. 5, this includes the leading edge 101 of the sheet 100 overlaps with the trailing edge 111 of the roll 110. In one example as illustrated in FIG. 5, this includes the leading edge 101 of the sheet 100 positioned over the trailing edge 111 of the roll 110. In another example, the leading edge 101 is positioned under the trailing edge 111.

Figure 6:
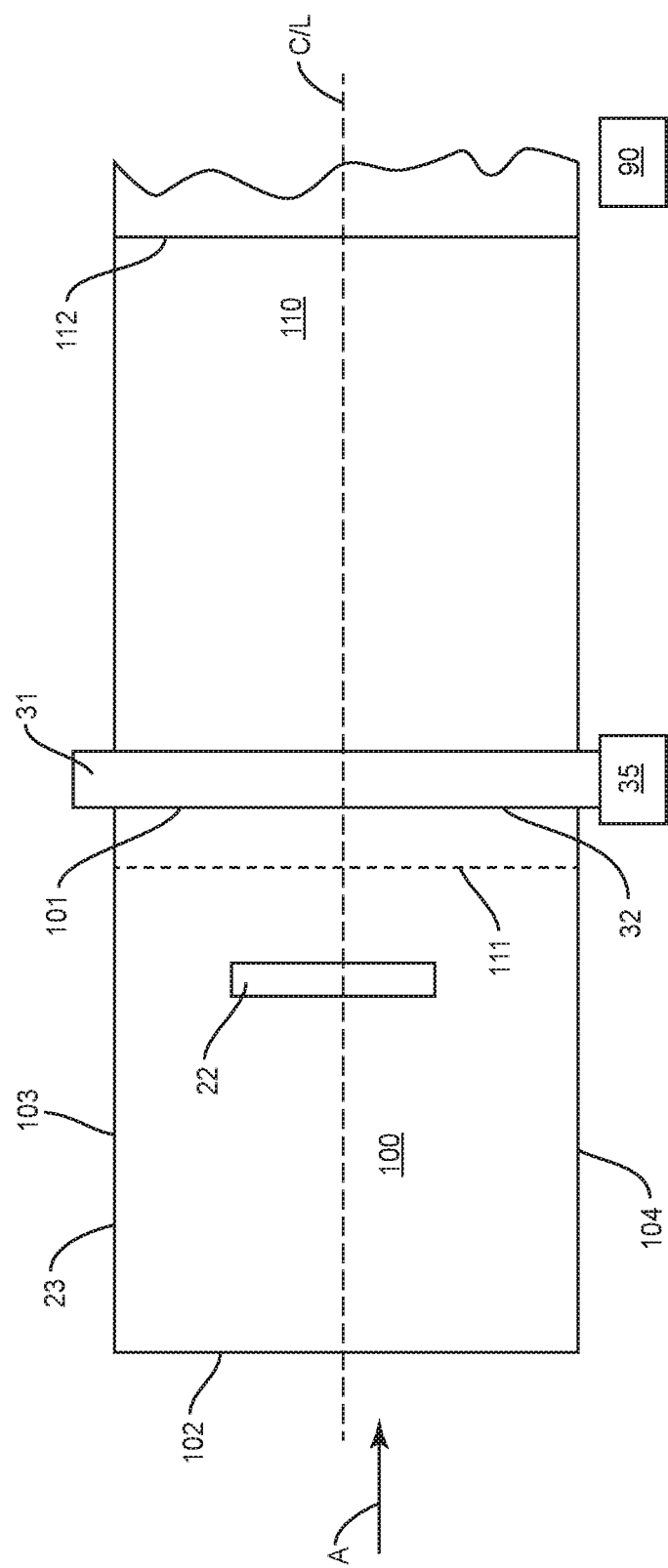
FIG. 6 is a top view of a positioning bar positioned at an overlap between a sheet and a roll of material.

To facilitate the positioning of the leading edge 101 of the sheet 100 relative to the trailing edge 111 of the roll 110, the moving system 20 can include a positioning bar 31 that acts as a stop for the sheet 100. As illustrated in FIGS. 5 and 6, a positioning bar 31 is located along the feed path 23 to contact against and stop the movement of the sheet 100 along the feed path 23.

The positioning bar 31 is positioned over the roll 110 at a point downstream from the trailing edge 111. This positioning provides for a section of the roll 110 including the trailing edge 111 to be positioned outward from the positioning bar 31. The length of the extending section can vary depending upon the desired connection with the sheet 100. The positioning bar 31 can be oriented with an upstream contact edge 32 perpendicular to a centerline C/L of the feed path 23. In another example, the contact edge 32 is located at a non-perpendicular angle relative to the C/L of the feed path 23.

The positioning bar 31 can extend completely across the width of the feed path as illustrated in FIG. 6. In another example, the positioning bar 31 is narrower than the feed path 23 and extends a limited distance across the width. The positioning bar 31 can be constructed from a single member as illustrated in FIG. 6, or from two or more members that are spaced apart by one or more gaps.

The positioning bar 31 includes the contact edge 32 that faces upstream on the feed path 23 to contact the leading edge 101 of the sheet 100. The contact edge 32 is straight and includes a flat surface to contact the leading edge 101. In another example, the contact edge 32 includes protrusions that extend outward to contact against the leading edge. The contact edge 32 can be orientated at different alignments relative to the surface of the support 122. In one example, the contact edge 32 is perpendicular to the surface of the support 122 as illustrated in FIG. 5. In another example, the contact edge 32 is positioned at a non-perpendicular angle relative to the surface of the support 122.

The positioning bar 31 can include a unitary construction. In another example as illustrated in FIG. 5, the positioning bar 31 includes a main body 33 and a contact member 34 that includes the contact edge 32. The contact member 34 can be attached to the main body 33 through one or more fasteners or other mechanical engagement. In one example, the contact member 34 can be removed and replaced when it becomes worn or otherwise damaged over time due to the contact with the leading edges 101 of the sheets 100.

A lift mechanism 35 is operatively connected to the positioning bar 31 to raise and lower its position relative to the feed path 23. The lift mechanism 35 can selectively locate the positioning bar 31 between a lowered position at the support 122 and an elevated position away from the support 122. In one example, the lowered position includes the positioning bar 31 contacting against the roll 110. In another example, the lowered position is spaced upward and away from the roll 110. The lift mechanism 35 can include a motor to power the positioning. The lift mechanism 35 can also include pulleys, joints, etc. that are driven by the motor 25 to move the positioning bar 31. The lift mechanism 35 can provide for lifting or pivoting the positioning bar 31 between the lowered and elevated positions.

The welding system 50 connects the sheet 100 to the roll 110. The welding system 50 forms a weld seam 112 joining the leading edge 101 of each new sheet 100 to the trailing edge 111 of the roll 110. The welding system 50 includes one or more welding shoes 51 configured to apply heat along the edges 101, 111. The welding shoes 51 are heated and placed in contact with the sheet 100 and roll 110 for a predetermined period of time. The solid thermoplastic matrix of the sheet 100 and roll 110 temporarily melts or reduces in viscosity at the location of the welding shoes 51. The melted or reduced-viscosity thermoplastic material at least partially intermingles such that when the welding shoes 51 are removed, the thermoplastic matrix cools and re-solidifies to form a weld seam 112 that permanently binds the sheet 100 to the roll 110.

Figure 7:
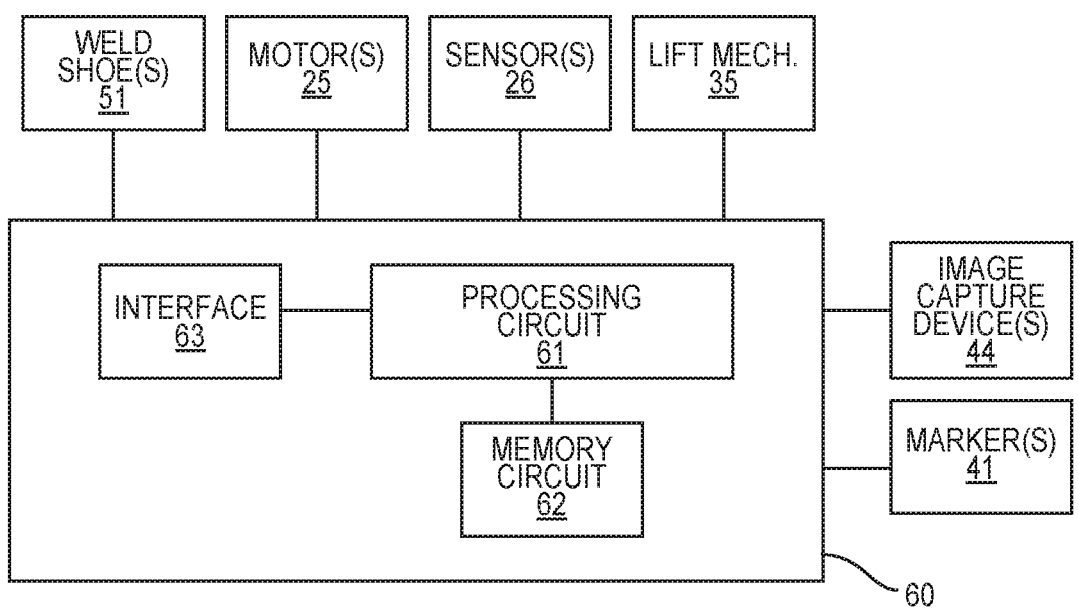
FIG. 7 is a schematic diagram of a controller that operates an assembly.

A controller 60 oversees the movement of the sheet 100 along the feed path 23. As illustrated in FIG. 7, the controller includes a processing circuit 61 and a memory circuit 62. The processing circuit 61 controls the operation of the assembly 10 according to program instructions stored in the memory circuit 62. Within examples, the processing circuit 61 includes one or more circuits, microcontrollers, microprocessors, hardware, or a combination thereof. Memory circuit 62 includes a non-transitory computer readable storage medium storing program instructions, such as a computer program product, that configures the processing circuit 61 to implement one or more of the techniques discussed herein. Memory circuit 62 can include various memory devices such as, for example, read-only memory, and flash memory. In one example, memory circuit 62 is a separate component as illustrated in FIG. 7. In another example, memory circuit 62 is incorporated with the processing circuit 61.

An interface 63 provides for a user to control one or more aspects of the assembly 10. This can include one or more displays for displaying information to the user and/or one or more input devices such as but not limited to a keypad, touchpad, roller ball, and joystick. The interface 63 provides for the user to enter commands to the processing circuit 61.

The controller 60 is configured to send and/or receive signals to the motors 25, sensors 26, lift mechanism 35, and welding shoes 51 to control the movement of sheets 100 along the feed path 23 and connection to the roll 110. The controller 60 can also send and/or receive signals from one or more image capture devices 44 and markers 41 as will be explained in more detail below.

FIG. 7 includes the controller 60 overseeing and controlling the various components of the assembly 10. In another example, one or more sub-controllers perform specific operations within assembly process. For example, a moving sub-controller can control the picking of a sheet 100 from the tray 120 and movement along the feed path 23. The sub-controller can signal the status of the controller 60 that oversees the entire assembly process.

Figure 8:
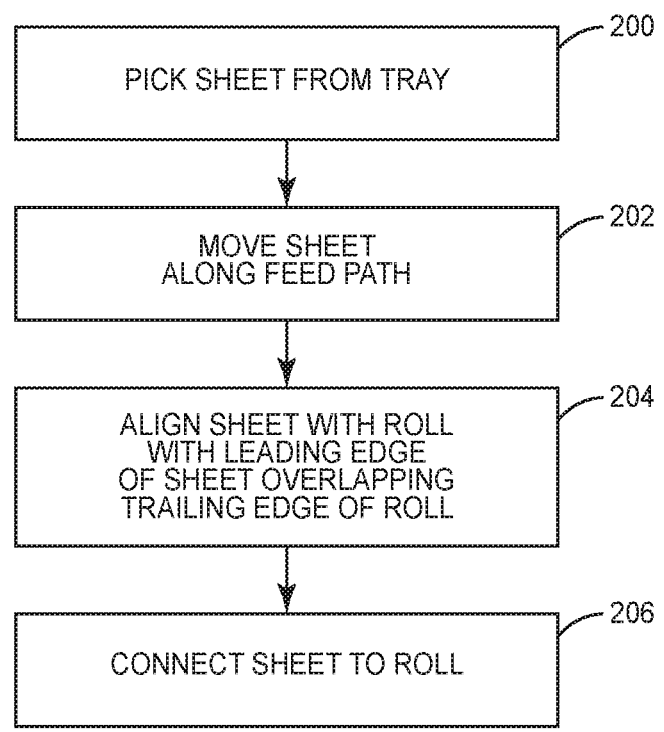
FIG. 8 is a flowchart diagram of a method of manufacturing a roll of material.

FIG. 8 includes a method of manufacturing a roll of prepreg material. The method includes picking a sheet 100 from the tray 120 (step 200). This can include the controller 60 rotating the one or more rollers 21 that are in contact with the top-most sheet 100 in the tray 120. Rotation of the rollers 21 moves the sheet 100 out of the tray 120 and along the feed path 23. The sheet 100 can pass between the rollers 21 and the separation pad 24 to prevent additional sheets 100 from being inadvertently picked and moved with the top-most sheet 100.

The controller 60 continues to rotate the rollers 21 as the sheet 100 remains in contact and moves along the feed path 23 (block 202). In one example, the controller 60 rotates the rollers 21 at a substantially constant rotational speed and drives the sheet 100 along the feed path 23 at a relatively constant speed. In another example, the controller 60 changes the rotational speed of the rollers 21 thus changing the speed of the sheet 100 along the feed path 23.

The controller 60 receives signals from the sensors 26 to monitor the position of the sheet 100. Once the controller 60 determines the position of the leading edge 101, the controller 60 is able to continually calculate the position of the leading edge 101 at any time using known values for the speed of the sheet 100 and known distances within the feed path 23, such as the length between the rollers 21, 22 and the length between rollers 22 and the positioning bar 31.

The sheet 100 moves along the feed path 23 and into contact with rollers 22. The distance between the rollers 21 and rollers 22 is less than a length of the sheet 100. This positioning ensures that the sheet 100 remains in contact with at least one of the rollers 21, 22 during movement along the feed path 23. The speed differential at which the controller 60 drives the sheet 100 with rollers 21 relative to rollers 22 can vary. In one example, the speed of the rollers 21, 22 is the same thus moving the sheet at a substantially constant speed. This can prevent pulling or potentially misalignment of the sheet 100 along the feed path 23 if the rollers 22 were rotated at a higher speed. In another example, rollers 22 are rotating at a speed slower than rollers 21. This can cause the sheet 100 to bow upward along an intermediate section between the leading and trailing edges 101, 102. This can cause the leading edge 101 to better align along the feed path 23.

Once the trailing edge 102 of the sheet 100 has moved beyond the rollers 21, the controller 60 stops the rotation of the rollers 21. This prevents the next sheet 100 in the tray 120 from being inadvertently picked and moved along the feed path 23. Likewise, the roller 22 may not be rotated until the leading edge 101 is at the rollers 22. This prevents potential wear on the rollers 22 and/or support 122. This can also save energy as the rollers 22 are not powered when they are not driving the sheets 100.

While the sheet 100 is moving along the feed path 23, the controller 60 positions the trailing edge 111 of the roll 110. In one example, the assembly 10 includes a roll device 90 to advancing the roll 110 after forming each weld seam 112. The roll device 90 can be located downstream from the positioning bar 31 and can periodically rotate the roll 110 and align the trailing edge 111. In one example, the roll device 90 advances the roll 110 until the trailing edge 111 is upstream from and in proximity to the positioning bar 31. The controller 60 can also position the positioning bar 31 to extend across the roll 110 with the desired length of the roll 110 extending outward upstream from the positioning bar 31.

The controllers 60 controls the rollers 22 to align the leading edge 111 of the sheet 100 into an overlapping position with the trailing edge 111 of the roll 110 (block 204). The controller 60 rotates the rollers 22 and moves the leading edge 101 into contact with the positioning bar 31. This positioning further locates the leading edge 101 of the sheet 100 into an overlapping arrangement with the trailing edge 111 of the roll 110.

In another example without a positioning bar 31, the controller 60 rotates the rollers 22 until the leading edge 101 overlaps the trailing edge 111. Once positioned, the controller 60 then stops the rotation of the rollers 22.

Once the leading edge 101 is aligned, the sheet 100 is connected to the roll 110 (block 206). The controller 60 can bring the one or more welding shoes 51 into contact with the sheet 100 and/or roll 110. During the connection, the controller 60 monitors and/or regulates one or more welding parameters such as but not limited to, the pressure, temperature, speed, and/or dwell time of one or more of the welding shoes 51. The welding system 50 can include one or more temperature sensors 26 to monitor the temperature of the welding shoes 51 and/or monitor the temperature of the sheet 100 and the roll 110 at the location of the abutting end edges. Once complete, a weld seam 112 is formed that connects the sheet 100 to the roll 110.

In one example, the positioning bar 31 is lifted away from the feed path 23 prior to connecting the sheet 100 with the welding system 50. This can provide space for the welding system 50 to access the sheet 100 and/or roll 110 and form the weld seam 112. In another example, the positioning bar 31 remains in a downward position at the time that the sheet 100 is connected to the roll 110.

The alignment system 40 can also include a marking and optical system 80 to align the sheet 100 with the roll 110. As illustrated in FIG. 9, the marking and optical system 80 includes one or more markers 41 and image capture devices 44.

The markers 41 form one or more marks 43 on the roll 110. In one example, the markers 41 are configured for inkjet printing. The markers 41 include a nozzle 42 through which droplets of ink are propelled onto the roll 110. In one example, the markers 41 include printheads having piezoelectric crystals that deposit the ink onto the roll 110. In another example, the markers 41 include an ink stamp that contacts against the deposits ink onto the roll 110. In another example, the markers 41 form a paint dot on the roll 110. In examples with multiple markers 41, the markers 41 can be the same or different.

The marks 43 are formed at the trailing edge 111 of the roll 110. As illustrated in FIG. 9A, the marks 41 include an edge 45 that is positioned a distance x from the trailing edge 111 of the roll 110. In one example, the distance x is equal to the minimum amount of predetermined overlap between the roll 110 and the sheet 100. The mark 43 can include various shapes and sizes. In one example as illustrated in FIG. 9A, the mark 43 includes an edge 45 that is straight and parallel to the trailing edge 111. In another example, the edge 45 includes a rounded shape.

One or more image capture devices 44 capture an image of the sheet 100 and roll 110. If one or more of the marks 43 are visible, the amount of overlap is inadequate. If the one or more marks 43 are not visible, the amount of overlap is adequate. A variety of image capture devices 44 can capture the images. Examples include but are not limited to laser micrometers, cameras including still cameras and/or video cameras, and fiber optic sensors.

As illustrated in FIG. 10, the sheet 100 is positioned over the roll 110. Specifically the leading edge 101 of the sheet 100 overlaps with the trailing edge 111 of the roll 110. Images of the one or more marks 43 are captured by the image capture devices 44. The controller 60 determines the extent of overlap between the sheet 100 and roll 110 based on the one or more images. In one example, a single image capture device 44 (e.g., a single camera) captures an image of the one or more marks 43. In another example, a pair of image capture devices 44 (e.g., a pair of cameras) captures images of a pair of marks 43 with each image capture device 44 capturing an image of one of the marks 43.

The controller 60 determines whether the marks 43 are visible beyond the leading edge 101 of the sheet 100. If the one or more marks 43 are not visible, the controller 60 determines that the sheet 100 is overlapping the roll 110 by an adequate amount. The controller 60 can then connect the sheet 100 to the roll 110.

If one or more of the marks 43 are visible, the controller 60 determines that the sheet 100 is not overlapping an adequate amount with the roll 110. The controller 60 activates the rollers 22 and moves the sheet 100 an additional amount along the feed path 23 and increases the overlap with the roll 110. One or more additional images can be captured by the one or more image capture devices 44. The controller 60 again determines whether one or more of the marks 43 are visible. The process continues until the one or more marks 43 are not visible and there is an adequate amount of overlap between the sheet 100 and the roll 110.

In one example, the one or more marks 43 are positioned the overlap position (i.e., along the line x) and extend a limited distance towards the trailing edge 111.

The assembly 10 may maintain the sheets 100 in the same orientation as they are while in the tray 120. The moving system 20 and alignment system 40 pick and move the sheets 100 along the feed path 23 without any rotation. The sheets 100 are placed in the tray 120 in the orientation in which they will be connected to the roll 110.

Figure 11:
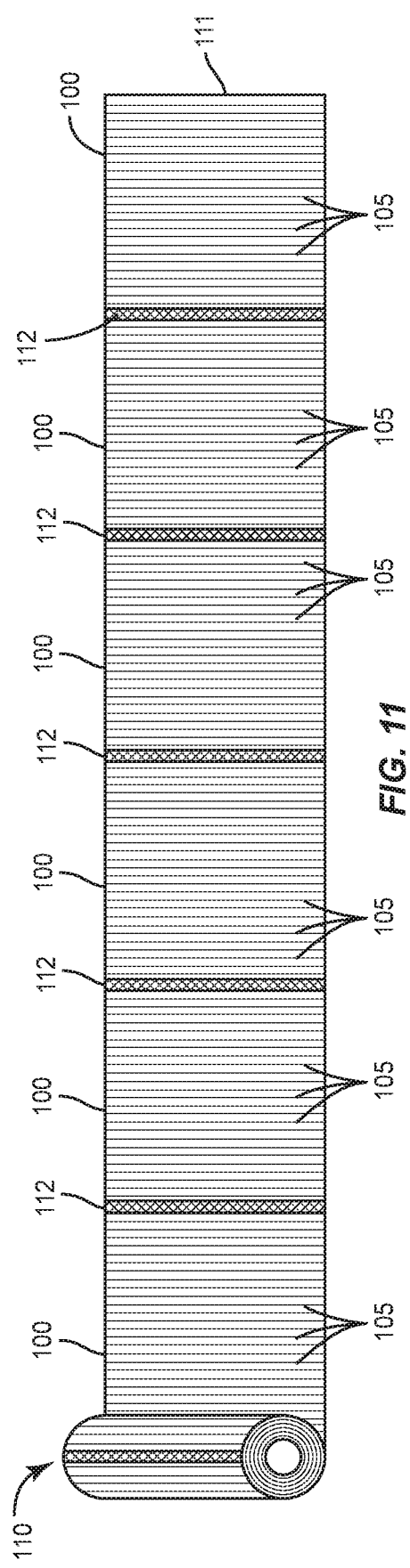
FIG. 11 is a perspective view of a roll having a 0 degree orientation.
Figure 12:
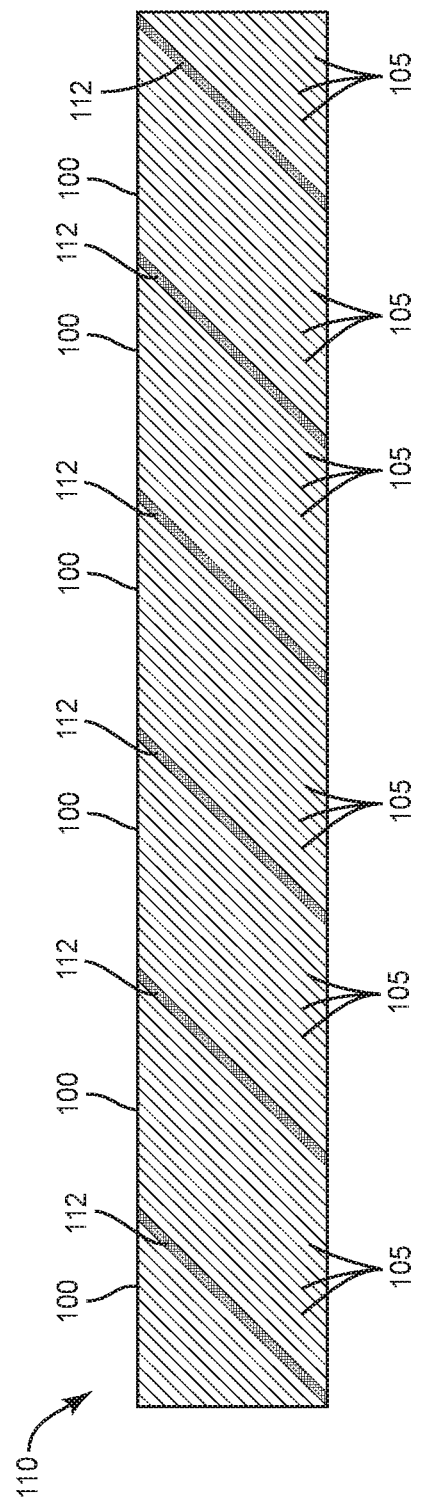
FIG. 12 is a perspective view of a roll having a 90 degree orientation.

The sheets 100 can be connected to the roll 110 in a variety of orientations. FIG. 11 illustrates a 90° roll 110 with a majority of the fibers 105 of the sheets 100 being substantially perpendicular to the lengthwise direction of the roll 110. FIG. 12 illustrates a roll with a majority of the fibers 105 aligned at a 45° angle relative to the lengthwise direction of the roll 110. The seams 112 connecting the adjacent sheets 100 are also aligned at a 45°. Rolls 110 can also be formed with the fibers 105 at various other angles, such as but not limited to 15°, 22.5°, 30°, and 60°.

The prepreg material can be used in a wide variety of contexts. One context includes the construction of various components and bodies for vehicles. One example of a vehicle is a commercial aircraft used for transporting passengers and/or cargo. One example of a vehicle structure is a wing or wing component of an aircraft. Other vehicles include but are not limited to unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly to manufacture a roll of prepreg material, the assembly comprising:
    a tray;
    a feed path that extends from the tray;
    at least one pick roller positioned at the feed path, the at least one pick roller configured to rotate to pick a sheet of the prepreg material from the tray and to move the sheet along the feed path;
    a positioning bar that extends across the feed path downstream from the at least one pick roller, the positioning bar comprises an edge configured to contact against a leading edge of the sheet; and
    at least one welding shoe that locally heats a trailing edge of the roll and the leading edge of the sheet and forms a weld seam that joins the sheet in an overlapping arrangement with the roll.

2. The assembly of claim 1, further comprising at least one alignment roller positioned along the feed path downstream from the at least one pick roller and upstream from the positioning bar, the at least one alignment roller contacts against the sheet and to rotate to move the sheet into contact with the positioning bar.

3. The assembly of claim 1, wherein the feed path further comprises a support positioned along the feed path between the at least one pick roller and the positioning bar, the support comprising a top surface that supports the sheet and an edge that extends along a lateral edge of the support to laterally position the sheet while the sheet moves along the feed path.

4. The assembly of claim 3, further comprising a separation pad positioned along the feed path between the tray and the support and positioned on an opposing side of the feed path from the at least one pick roller, the separation pad comprising a support surface to contact the sheet and maintain the sheet in contact with the at least one pick roller as the sheet moves from the tray.

5. The assembly of claim 1, further comprising a marking and optical system comprising:
    at least one marker to form one or more marks on the roll in proximity to the trailing edge of the roll; and
    at least one image capture device to capture at least one image of the trailing edge of the roll and the leading edge of the sheet.

6. The assembly of claim 5, wherein the at least one marker comprises a nozzle to emit ink onto the roll and form the one or more marks.

7. The assembly of claim 5, wherein the positioning bar extends laterally across the feed path and is positioned downstream from the at least one marker and the at least one welding shoe.

8. The assembly of claim 5, further comprising a controller that determines an amount of overlap between the trailing edge of the roll and the leading edge of the sheet based on the at least one image captured by the at least one image capture device.

9. The assembly of claim 1, wherein the positioning bar is vertically adjustable relative to the feed path between a first position that is in proximity to the feed path for the leading edge of the sheet to contact against the positioning bar and a second position that is positioned away from the feed path for the sheet to pass along the feed path underneath the positioning bar.

10. An assembly to manufacture a roll of prepreg material, the assembly comprising:
    a controller comprising a control circuit, the controller configured to:
        rotate at least one pick roller and move a sheet of the prepreg material from a tray and along a feed path;
        position a positioning bar across the feed path to contact a leading edge of the sheet when the leading edge is overlapping with a trailing edge of the roll;
        determine an amount of overlap between the leading edge of the sheet and the trailing edge of the roll; and
        connect together the sheet and the roll with the leading edge of the sheet overlapping with the trailing edge of the roll.

11. The assembly of claim 10, wherein the controller is further configured to form at least one mark on the trailing edge of the roll and capture at least one image of the trailing edge of the roll after the leading edge of the sheet overlaps with the roll.

12. An assembly to manufacture a roll of prepreg material, the assembly comprising:
    a controller comprising a control circuit, the controller configured to:
        rotate at least one pick roller that is in contact with a sheet and move the sheet along a feed path;
        contact a leading edge of the sheet against a positioning bar that extends across the feed path and stop the sheet with the leading edge overlapping with a trailing edge of the roll;
        identify that the leading edge of the sheet and the trailing edge of the roll are in an overlapping arrangement; and
        connect together the sheet to the trailing edge of the roll with the leading edge of the sheet overlapping with the trailing edge of the roll.

13. The assembly of claim 12, wherein the controller is further configured to mark the trailing edge of the roll with at least one mark prior to overlapping the leading edge of the sheet with the trailing edge of the roll.

14. The assembly of claim 13, wherein the controller is further configured to determine an amount of the at least one mark that is visible beyond the sheet and determining the overlap between the leading edge of the sheet and the trailing edge of the roll.

15. The assembly of claim 12, wherein the controller is further configured to prevent an underneath sheet from being picked with the sheet by moving the sheet between the at least one pick roller and a separation pad.

16. The assembly of claim 12, wherein the controller is further configured to maintain an orientation of the sheet while moving the sheet along the feed path.

17. The assembly of claim 12, wherein the controller is further configured to move the positioning bar away from the feed path after the leading edge of the sheet contacts against the positioning bar and prior to connecting together the sheet and the roll.

18. The assembly of claim 12, wherein the controller is further configured to position the trailing edge of the roll on an upstream side of the positioning bar and overlapping the leading edge of the sheet on the upstream side of the positioning bar.

19. The assembly of claim 12, wherein the controller is further configured to:
   rotate at least one alignment roller concurrently with the at least one pick roller and move the leading edge into contact with the positioning bar with the at least one alignment roller being positioned along the feed path downstream from the at least one pick roller; and
   stop the rotation of the at least one alignment roller after the leading edge contacts against the positioning bar.

20. The assembly of claim 19, wherein the controller is further configured to concurrently contact the sheet with the at least one alignment roller and the at least one pick roller.

* * * * *